United States Patent
Cuellar et al.

(10) Patent No.: US 11,212,078 B2
(45) Date of Patent: Dec. 28, 2021

(54) METHOD FOR SENDING DIGITAL DATA OVER A NUMBER OF CHANNELS

(71) Applicant: Siemens Aktiengesellschaft, Munich (DE)

(72) Inventors: Jorge Cuellar, Baierbrunn (DE); Tiago Gasiba, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 99 days.

(21) Appl. No.: 16/645,813

(22) PCT Filed: Sep. 4, 2018

(86) PCT No.: PCT/EP2018/073650
§ 371 (c)(1),
(2) Date: Mar. 10, 2020

(87) PCT Pub. No.: WO2019/052844
PCT Pub. Date: Mar. 21, 2019

(65) Prior Publication Data
US 2020/0204354 A1    Jun. 25, 2020

(30) Foreign Application Priority Data
Sep. 13, 2017 (EP) .................... 17190779

(51) Int. Cl.
*H04L 9/06* (2006.01)
*H03M 13/15* (2006.01)
(Continued)

(52) U.S. Cl.
CPC ........ *H04L 9/0662* (2013.01); *H03M 13/154* (2013.01); *H04L 1/0064* (2013.01);
(Continued)

(58) Field of Classification Search
CPC .................................................... H04L 9/0662
See application file for complete search history.

(56) References Cited

U.S. PATENT DOCUMENTS 7,548,556 B1  6/2009  Wittenschlaeger
9,496,897 B1  11/2016  Triandopoulos et al.
(Continued)

FOREIGN PATENT DOCUMENTS

| CN | 1914922 A | 2/2007 |
| CN | 101485137 A | 7/2009 |
| CN | 104205698 A | 12/2014 |

OTHER PUBLICATIONS

Yong Cui et al: "FMTCP: A Fountain Code-Based Multipath Transmission Control Protocol", IEEE/ ACM Transactions on Networking, IEEE/ ACM, New York, NY, US, vol. 23, No. 2, pp. 465-478, XP058071800, ISSN: 1063-6692, DOI: 10.1109/TNET. 2014.2300140, Section IV; pp. 468-470; 2015.
(Continued)

*Primary Examiner* — Simon P Kanaan
(74) *Attorney, Agent, or Firm* — Schmeiser, Olsen & Watts LLP

(57) ABSTRACT

Provided is a method for sending digital data over a number of channels wherein a sender performs the following steps: encoding source data having a first number of source symbols, the encoding being such that an error correction code is generated from the source data, the error correction code comprising a second number of repair symbols higher than the first number as well as identifiers where each identifier is assigned to a corresponding repair symbol, the error correction code adding redundancy to the source data; encrypting each repair symbol by an encryption process which is based on a shared secret between the sender and a receiver, where the encryption process for a respective repair symbol depends on the identifier assigned to the respective (Continued)

repair symbol; feeding pairs of the encrypted repair symbols and the assigned identifiers to the number of channels which are connected to the receiver.

15 Claims, 1 Drawing Sheet

(51) Int. Cl.
    *H04L 1/00*     (2006.01)
    *H04L 9/08*     (2006.01)
    *H04L 29/06*     (2006.01)

(52) U.S. Cl.
    CPC ........ *H04L 9/0869* (2013.01); *H04L 63/0428* (2013.01); *H04L 63/18* (2013.01)

(56) References Cited

U.S. PATENT DOCUMENTS

| | | | |
|---|---|---|---|
| 2005/0257106 A1* | 11/2005 | Luby | H04L 1/0057 714/710 |
| 2006/0279437 A1* | 12/2006 | Luby | H03M 13/2906 341/50 |
| 2007/0177719 A1 | 8/2007 | Dei et al. | |
| 2007/0195894 A1* | 8/2007 | Shokrollahi | H04L 1/0045 375/242 |
| 2009/0208019 A1 | 8/2009 | Celik et al. | |
| 2011/0035642 A1 | 2/2011 | Francillon et al. | |
| 2013/0227376 A1* | 8/2013 | Hwang | H03M 13/2707 714/776 |
| 2015/0256290 A1 | 9/2015 | Hwang et al. | |

OTHER PUBLICATIONS

PCT International Search Report and Written Opinion of International Searching Authority dated Dec. 20, 2018 corresponding to PCT International Application No. PCT/EP2018/073650 filed Sep. 4, 2018.

European Extended Search Report dated Apr. 4, 2018 for Application No. 17190779.3.

* cited by examiner

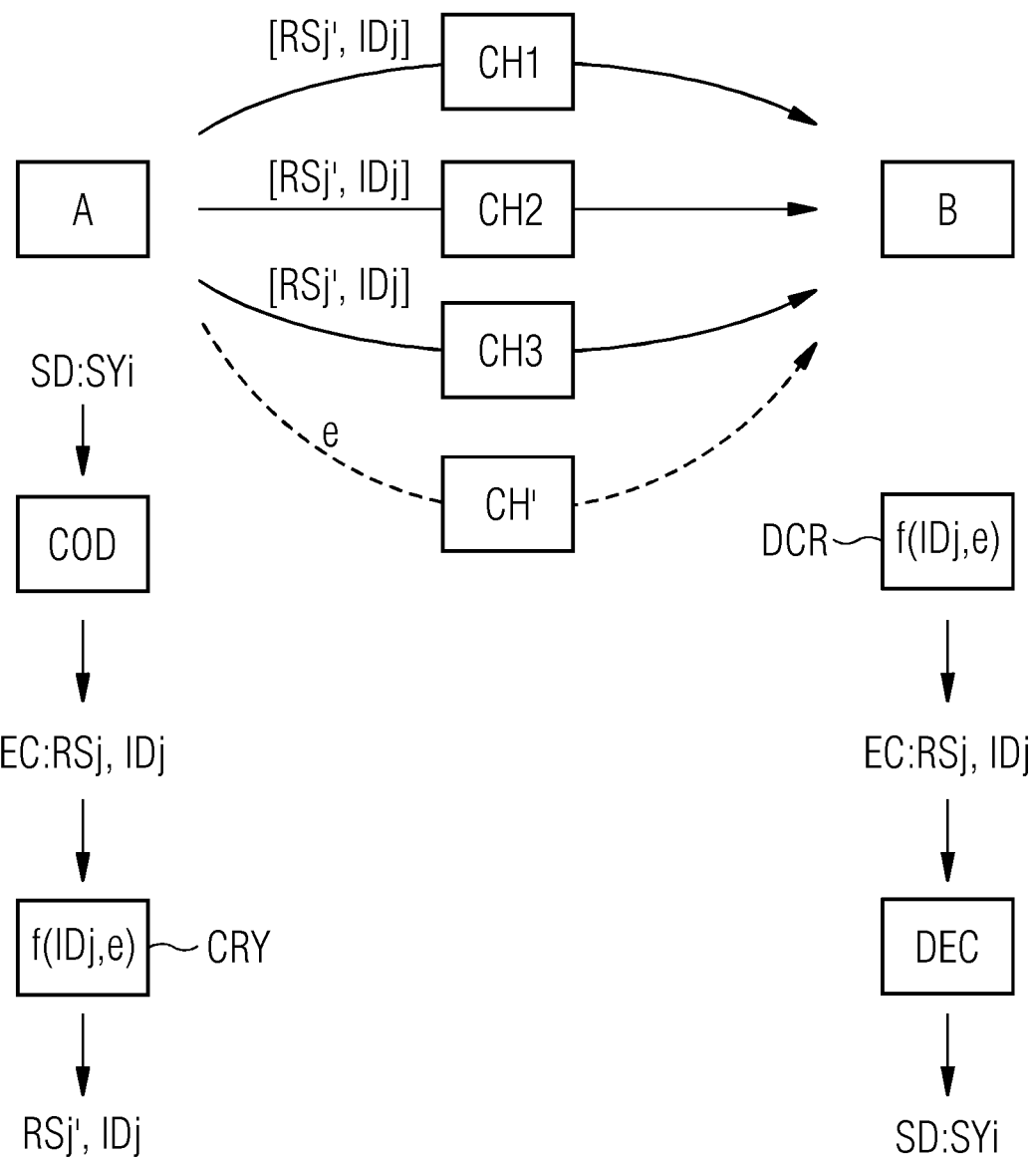

METHOD FOR SENDING DIGITAL DATA OVER A NUMBER OF CHANNELS

CROSS-REFERENCE TO RELATED APPLICATIONS

This application claims priority to PCT Application No. PCT/EP2018/073650, having a filing date of Sep. 4, 2018, which is based on European Application No. 17190779.3, having a filing date of Sep. 13, 2017, the entire contents both of which are hereby incorporated by reference.

FIELD OF TECHNOLOGY

The following refers to a method for sending digital data of a number of channels. Furthermore, the invention refers to a method for processing digital data sent by the method for sending digital data. Moreover, the invention refers to a method for transmitting digital data from a sender to a receiver as well as to a corresponding sender and receiver. Moreover, the invention refers to a transmission system comprising a sender and a receiver.

BACKGROUND

When transmitting digital data from a sender to a receiver, data losses may occur due to transmission errors. In order to reconstruct the original data even in case of data losses, so-called error correction techniques, e.g. forward error correction, are used which encode the digital data to obtain an error correction code in which redundancy is added to the data.

Although error correction codes enable a reconstruction of the original source information in case of data losses, those codes do not provide cryptographic protection against attackers listening to the data transmission. To provide such a cryptographic protection, it is known from the conventional art to encrypt encoded symbol identifiers transmitted together with corresponding repair symbols of the error correction code. However, this encryption is not very strong.

Document U.S. Pat. No. 9,496,897 B1 discloses a method and an apparatus for encoding and decoding via authenticated error correction codes. To do so, the error correction codes are encrypted resulting in encrypted symbols for which an authentication value is computed based on a secret key shared by the encoder and decoder.

Document U.S. Pat. No. 7,548,556 B1 describes a method of securing a communication over a network fabric where the communication is divided into data chunks which are transmitted through different communication paths.

Document Yong Cui et al. "FMTCP: A Fountain Code-Based Multipath Transmission Control Protocol", IEEE/ACM TRANSACTIONS ON NETWORKING, IEEE/ACM, NEW YORK, N.Y., US, vol. 23, no. 2, 1 Apr. 2005, p. 465-478, discloses a fountain code-based multipath transmission control protocol.

SUMMARY

An aspect relates to a method for sending digital data over a number of channels enabling both an error correction as well as a strong encryption of the digital data being sent. Furthermore, an aspect relates to providing a method to reconstruct source data from the digital data sent by the method of embodiments of the invention.

The method of embodiments of the invention provides a mechanism for sending digital data over a number of channels, i.e., over at least one channel. The term "channel" is to be interpreted broadly and may refer to any continuous transmission path from a sender to a receiver. A channel may also have different channel portions being based on different transmission techniques. In the method of embodiments of the invention, a sender performs the steps as described in the following.

The sender encodes source data having a first number of source symbols, where the encoding is such that an error correction code is generated from the source data, the error correction code comprising a second number of repair symbols higher than the first number as well as identifiers where each identifier is assigned to a corresponding repair symbol. This error correction code adds redundancy to the source data. Any known technique for generating such an error correction code may be used in this step. Particularly, the error correction code may be a FEC code (FEC=Forward Error Correction). In a preferred embodiment, fountain coding is used, i.e., the error correction code is a fountain code.

After having generated the error correction code, the sender encrypts each repair symbol of this code by an encryption process which is based on a shared secret between the sender and a receiver by which the encrypted repair symbols shall be received, where the encryption process for a respective repair symbol depends on the identifier assigned to the respective repair symbol. The term "shared secret" refers to a secret value which shall only be known by the sender and the receiver.

In a next step, the sender feeds pairs of the encrypted repair symbols and the assigned identifiers to the number of channels. i.e., corresponding pairs, each comprising an encrypted repair symbol and the assigned identifier, are fed to the number of channels.

The method of embodiments of the invention has the advantage that a strong encryption of the error correction code is provided by encrypting the repair symbols not only based on a shared secret, but also in dependency of the corresponding identifiers.

In preferred embodiments of the invention, the source symbols and the repair symbols each are bit sequences having the same fixed bit length.

In preferred embodiments of the invention, the encryption process uses a pseudo-random function, i.e., a function of a pseudo-random generator. The terms "pseudo-random function" as well as "pseudo-random generator" are well-known for a skilled person. The pseudo-random function is applied to the repair symbols, where the pseudo-random function depends on the shared secret and on the identifier of the repair symbol to be encrypted. This embodiment provides an efficient realization of an encryption process depending on both the shared secret and the identifier of the repair symbol.

In a preferred implementation of the above variant, the pseudo-random function generates an intermediate bit sequence having the bit length of the repair symbol to be encrypted, the encrypted repair symbol being the XOR combination of the intermediate bit sequence with the repair symbol to be encrypted.

In another, particularly preferred embodiment, the number of channels comprises several independent channels where the pairs of the encrypted repair symbols and the assigned identifiers are fed to the independent channels such that each independent channel receives at least one pair of the encrypted repair symbols and the assigned identifiers. The term "independent channels" means that an access to one channel does not permit an access to any other independent channel. The use of independent channels strongly enhances the security of the data transmission as information from several channels is needed in order to reconstruct the whole data.

In a preferred variant of the above embodiment, the independent channels are channels of a multipath TCP protocol. This kind of protocol is known from the conventional art. However, the independent channels may also be defined differently, e.g. by different transmission technologies.

In a particularly preferred embodiment, the number of pairs of the encrypted repair symbols and the assigned identifiers in each independent channel is less than the first number referring to the number of source symbols. According to this embodiment, source symbols cannot be reconstructed by repair symbols in a single channel even in case that an attacker succeeds to decrypt the repair symbols.

In another variant of the method according to embodiments of the invention, the encryption process further depends on the channel to which the encrypted repair symbol is fed, resulting in an enhanced security against attacks.

The above described shared secret used for encryption may be notified to the receiver before sending data based on the method of embodiments of the invention. However, in preferred embodiments of the invention, parallel to the feeding of the pairs of the encrypted repair symbols and the assigned identifiers to the number of channels, the shared secret is fed by the sender to an additional channel being connected to the receiver and being independent of the channels of the number of channels. Hence, the transmission of the shared secret needs not be performed in a separate step but may be part of the method for sending data according to embodiments of the invention.

Besides the above method for sending digital data, embodiments of the invention also refer to a method for processing digital data being sent by the method of the invention or by one or more preferred embodiments of the method according to embodiments of the invention. To do so, a receiver performs the following steps:
  receiving the pairs of the encrypted repair symbols and the assigned identifiers over the number of channels;
  decrypting each encrypted repair symbol by a decryption process which is based on the shared secret between the sender and the receiver, resulting in the error correction code, where the decryption process for a respective encrypted repair symbol depends on the identifier assigned to the respective repair symbol;
  decoding the error correction code such that the source data are restored.

In case that the method for sending digital data uses an encryption process based on a pseudo-random function, the same pseudo-random function is used in the above method for processing digital data in order to decrypt the encrypted repair symbols. Particularly, in case that the pseudo-random function generates an intermediate bit sequence, the decryption will be such that a corresponding decrypted repair symbol is the XOR combination of the intermediate bit sequence with the encrypted repair symbol.

Embodiments of the invention also refers to a method for transmitting digital data from a sender to a receiver over a number of channels, where the sender performs a method for sending digital data according to embodiments of the invention or one or more preferred embodiments thereof and where the receiver performs a method for processing digital data according to embodiments of the invention or one or more preferred embodiments thereof.

Moreover, embodiments of the invention refer to a sender for sending digital data, wherein the sender comprises means for performing the method for sending digital data according to embodiments of the invention or one or more preferred embodiments thereof.

Furthermore, embodiments of the invention refer to a receiver for processing digital data wherein the receiver comprises means for performing the method for processing digital data according to embodiments of the invention or one or more preferred embodiments thereof.

Additionally, embodiments of the invention refer to a transmission system comprising the above sender as well as the above receiver.

BRIEF DESCRIPTION

Some of the embodiments will be described in detail, with reference to the following FIGURES, wherein like designations denote like members, wherein:

FIG. 1 shows a scenario where digital data are transmitted between a sender A and a receiver B using three channels CH1, CH2 and CH3. Additionally, to those three channels, a further channel CH' is used for transmitting a shared secret e, as will be explained further on.

DETAILED DESCRIPTION

As mentioned above, the term "channel" is to be interpreted broadly and refers to a continuous transmission path from sender A to sender B where the path can have portions with different transmission technologies. The channels CH1, CH2, CH3 and CH' are independent from each other. An attacker listening to one channel only receives information transmitted in this channel and not from the other channels.

In one variant of embodiments of the invention, the channels CH1, CH2 and CH3 may refer to different UDP Internet streams or to different channels of a multipath TCP protocol. Contrary to that, the channel CH' may refer to an SMS channel. In another setting, where only two channels are used between sender A and receiver B, one channel may use an intermediate node, like a proxy to which the communication is secured either from sender A or from receiver B. Thus, sender A can communicate with a remote proxy over a secure channel portion which in turn communicates with receiver B over a non-secure channel portion. For the other channel, the situation could be opposite. In this channel, sender A communicates with a proxy known to receiver B over a non-secure channel portion but this proxy communicates with the receiver B over a secure tunnel. If the two proxies are not too close, it is almost impossible for an attacker to control both non-secure channels.

The embodiment shown in FIG. 1 results in a data transmission providing an error correction as well as an efficient encryption for the data in the channels CH1 to CH3. The source data to be transmitted from sender A to sender B are designated in FIG. 1 by reference numeral SD. Those data are divided into k source symbols $SY_i$ ($i=0, 1, \ldots, k-1$) where this dividing step is performed by sender A. Each of the source symbols $SY_i$ has a fixed and equal number of bits b, i.e., b·k corresponds to the total number of source bits of the source data SD.

According to FIG. 1, the sender performs at first an encoding step COD which is based on a known error correction technique in order to generate an error correction code EC from the source data SD. This error correction code comprises n repair symbols $RS_j$ ($j=0, 1, \ldots, n-1$) as well as so-called encoded symbol identifiers $ID_j$ for each repair symbol. The repair symbols have the same number of bits b as the source symbols. However, the number of repair symbols is larger than the number of source symbols, i.e., n is a number larger than k.

In preferred embodiments of the invention, the encoding step COD generates well-known fountain codes. However, other types of error correction codes may be generated as well, provided that the encoding technique COD results in a code adding redundancy to the original source data SD so that the source data can be restored after transmission even if some information got lost during transmission.

When generating a fountain code as an error correction code EC, the respective repair symbols RSj are typically determined by first computing, in dependence on the encoded symbol identifier IDj, a degree d which is an integer in the range between 1 and k. Secondly, given the computed degree, d source symbols are selected from the source data. Those selected source symbols are then XORed in order to produce a repair symbol RSj. An ideal fountain code can recover source information from any k different repair symbols.

After having computed the error correction code EC, the sender A applies an encryption method CRY on the respective repair symbols RSj. This encryption uses a pseudo-random function f(IDj, e) which generates b random bits in dependence on the respective encoded symbol identifier IDj and in dependence on the shared secret e between the sender A and the receiver B. Those random bits are XORed with the corresponding repair symbol RSj in order to obtain the encrypted repair symbol RSj'.

The sender A and the sender B may have received the shared secret e before the transmission of the source data SD. However, as shown in the embodiment of FIG. 1, the shared secret e is transmitted between sender A and sender B over the channel CH' simultaneously to the data transmission over the channels CH1 to CH3.

An essential feature of embodiments of the invention resides in the fact that the encryption CRY is not only based on the shared secret e but also depends on the encoded symbol identifier IDj. This improves the security of the data transmission because the encryption process is different for different repair symbols RSj.

The encryption CRY of FIG. 1 results in the encrypted repair symbols RSj' where the respective identifiers IDj of the non-encrypted repair symbols RSj are assigned to the respective encrypted repair symbol RSj'. In a next step, respective pairs [RSj', IDj] of encrypted repair symbols and encoded symbol identifiers are sent by the sender A over the channels CH1 to CH3, where each channel transmits a subset of those pairs. The encoded symbol identifier IDj needs to be transmitted together with the encrypted repair symbol RSj' in order to determine which repair symbols have been lost in case that not all repair symbols are received by the receiver B. This information is needed in order to reconstruct the source symbols in case of data losses.

In the embodiment described herein, the number of pairs of encrypted repair symbols and encoded symbol identifiers transmitted over each of the channels CH1 to CH3 is always less than the original number k of source symbols. This ensures that an attacker listening to one channel cannot reconstruct any source symbols from this channel even in case that he succeeds to decrypt the encrypted repair symbols RSj'.

After having received the pairs [RSj', IDj] over channels CH1 to CH3 as well as the shared secret e over channel CH', the receiver B performs a decryption method DCR in order to decrypt the encrypted repair symbols RSj'. This decryption uses the same function f(IDj, e) as the encryption method. To obtain the decrypted repair symbols RSj, the sequence of random bits being the value of the function f(IDj, e) is XORed with the respective encrypted repair symbol RSj', i.e., RSj=RSj' XOR f(IDj, e).

As a result of the decryption step DCR, the original error correction code EC comprising the non-encrypted repair symbols RSj and the corresponding encoded symbol identifiers IDj is obtained. Thereafter, the receiver performs a decoding DEC being inverse to the encoding COD in order to reconstruct the original source data SD with source symbols SYi. This decoding enables the restoration of the source data even in case that some of the repair symbols are lost.

In a modification of the embodiment of FIG. 1, the encryption of the repair symbols additionally depends on the channel over which the respective repair symbol is sent. This can be achieved by a pseudo-random function f which additionally depends on the corresponding channel CHx (x=1, 2, 3). A pseudo-random function f(IDj, e, CHx) is used. There are several options for the receiver B to correctly identify the channels. For instance, the channels can identify themselves to the receiver B (e.g. by static allocation, broadcast information, peer-to-peer data exchange, hashing, etc.). Alternatively, the receiver B is able to identify the channels. E.g., the receiver may know that the first channel uses UDP while the second one uses a mail channel and so on, or the sender may have sent some tags on the data to identify the channel.

When using a function depending on the channels, the sender A computes RSj'=RSj XOR f(IDj, e, CHx) for the channel CHx and sends the pair [RSj', IDj] over the channel CHx. At the receiver side, repair symbols that are received through channel CHx are reverted by computing RSj=RSj' XOR f(IDj, e, CHx). After having reverted the repair symbols based on the function f(IDj, e, CHx), the standard error correction decoding DEC described with respect to FIG. 1 can be used in order to recover the source data SD.

In the following, an example of an encoding and encryption of source symbols and the corresponding decoding and decryption is described. In this example, a sender wishes to transmit the following three source symbols to a receiver:
SY0=00001010
SY1=10100000
SY2=10101010

The sender at first generates fountain codes in the form of seven repair symbols RS1 to RS6 which read as follows:

$RS0 = SY0 = 00001010$ $RS1 = SY1 = 10100000$ $RS2 = SY2 = 10101010$ $RS3 = SY0 \; XOR \; SY1 = 10101010$ $RS4 = SY0 \; XOR \; SY2 = 10100000$ $RS5 = SY1 \; XOR \; SY2 = 00001010$ $RS6 = SY0 \; XOR \; SY1 \; XOR \; SY2 = 00000000$

An encoded symbol identifier IDj is associated with each repair symbol RSj (j=0, 1, . . . , 6). E.g., the identifiers may be chosen to be ID0=0, ID1=1, ID2=2, ID3=3, ID4=4, ID5=5, ID6=6. The sender also generates the shared secret e, e.g. by computing the random number e=33 by a pseudo-random generator. Based on the shared secret e and the encoded symbol identifiers IDj, the function f(IDj, e) generates the following intermediate bit sequences for the respective seven repair symbols RS0 to RS6:
f(ID0,e)=00010101
f(ID1,e)=10111101
f(ID2,e)=11011100
f(ID3,e)=01000010
f(ID4,e)=01010001
f(ID5,e)=01001011
f(ID6,e)=11010001

Based on those intermediate bit sequences, the sender computes the encrypted repair symbols RSj as follows:
RS0'=RS0  XOR  f(ID0,e)=00001010  XOR  00010101=00011111
RS1'=RS1  XOR  f(ID1,e)=10100000  XOR  10111101=00011101
RS2'=RS2  XOR  f(ID2,e)=10101010  XOR  11011100=01110110
RS3'=RS3  XOR  f(ID3,e)=10101010  XOR  01000010=11101001
RS4'=RS4  XOR  f(ID4,e)=10100000  XOR  01010001=11110001
RS5'=RS5  XOR  f(ID5,e)=00001010  XOR  01001011=01000001
RS6'=RS6  XOR  f(ID6,e)=00000000  XOR  11010001=11010001

In a next step, the pairs of encoded repair symbols RSj and assigned identifiers IDj are sent over at least one channel, e.g. the Internet. The pairs [RS0', ID0], [RS1', ID1], [RS2', ID2], [RS3', ID3], [RS4', ID4], [RS5', ID5] and [RS6', ID6] are sent through the at least one channel. Contrary to that, the shared secret e=33 is sent through another different channel, e.g. through SMS. Upon receiving e and the pairs [RSj', IDj] (where some of the pairs may be dropped due to channel errors), the receiver can recompute RSj from RSj' by using f(IDj, e), i.e., by determining RSj=RSj' XOR f(IDj, e). Afterwards, a standard error correction decoding is performed on the correctly received repair symbols in order to recover the original source information comprising the source symbols SY0, SY1 and SY2.

In the foregoing, a pseudo-random function f is used in the process for encrypting and decrypting the error correction code. However, it may also be possible to use a normal function instead of a pseudo-random function. Nevertheless, in case that the output length of the function f is longer than the length of the shared secret e, it is preferable to use a pseudo-random function instead of a normal function.

Embodiments of the invention as described in the foregoing has several advantages. Particularly, a method for data transmission is provided achieving both an error correction by adding redundancy as well as a high security by encrypting the error correction code in dependency on the encoded symbol identifiers of the respective repair symbols in the error correction code.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for sending digital data over a number of channels, the method comprising:
encoding source data having a first number of source symbols, the encoding being such that an error correction code is generated from the source data, the error correction code comprising a second number of repair symbols higher than the first number as well as identifiers where each identifier is assigned to a corresponding repair symbol, the error correction code adding redundancy to the source data;
encrypting each repair symbol by an encryption process which is based on a shared secret between a sender and a receiver, where the encryption process for a respective repair symbol depends on the identifier assigned to the respective repair symbol; and
feeding pairs of the encrypted repair symbols and the assigned identifiers to the number of channels which are connected to the receiver.

2. The method according to claim 1, wherein the error correction code is a fountain code.

3. The method according to claim 1, wherein the source symbols and the repair symbols each are bit sequences having the same fixed bit length.

4. The method according to claim 1, wherein the encryption process uses a pseudo-random function applied to the repair symbols, the pseudo-random function depending on the shared secret and on the identifier assigned the repair symbol to be encrypted.

5. The method according to claim 4, wherein the pseudo-random function generates an intermediate bit sequence having a bit length of the repair symbol to be encrypted, the encrypted repair symbol being the XOR combination of the intermediate bit sequence with the repair symbol to be encrypted.

6. The method according to claim 1, wherein the number of channels comprises several independent channels where the pairs of the encrypted repair symbols and the assigned identifiers are fed to the independent channels such that each independent channel receives at least one pair of the encrypted repair symbols and the assigned identifiers.

7. The method according to claim 6, wherein the independent channels are channels of a Multipath TCP protocol.

8. The method according to claim 6, wherein the number of pairs of the encrypted repair symbols and the assigned identifiers in each independent channel is less than the first number.

9. The method according to claim 6, wherein the encryption process further depends on the channel to which the encrypted repair symbol is fed.

10. The method according to claim 1, wherein, parallel to the feeding of the pairs of the encrypted repair symbols and the assigned identifiers to the number of channels, the shared secret is fed by the sender to an additional channel being connected to the receiver and being independent of the channels of the number of channels.

11. A method for processing digital data being sent by a method according to claim 1, wherein the receiver performs the following steps:
receiving the pairs of the encrypted repair symbols and the assigned identifiers over the number of channels;
decrypting each encrypted repair symbol by a decryption process which is based on the shared secret between the sender and the receivers, resulting in the error correction code, where the decryption process for a respective encrypted repair symbol depends on the identifier assigned to the respective repair symbol; and
decoding the error correction code such that the source data are restored.

12. A method for transmitting digital data from the sender to the receiver over a number of channels, wherein the sender performs a method according to claim 1 and the receiver performs a method.

13. A sender for sending digital data, wherein the sender comprises means for performing a method according to claim 1.

14. A receiver for processing digital data wherein the receiver comprises means for performing a method according to claim 11.

15. A transmission system, comprising the sender according to claim 13 and the receiver.

\* \* \* \* \*